United States Patent
Bell et al.

[11] Patent Number: 5,971,462
[45] Date of Patent: Oct. 26, 1999

[54] VEHICLE SPARE TIRE STORAGE SYSTEM HAVING A REINFORCED COVER

[75] Inventors: Larry W. Bell, Canton; Medard E. Kaluszka, Sterling Heights; Jeff D. Stevenson, Utica; Peter J. Schwartz, Clinton Township, all of Mich.

[73] Assignees: Chrysler Corporation, Auburn Hills, Mich.; Lear Corporation, Southfield, Mich.

[21] Appl. No.: 08/939,024

[22] Filed: Sep. 26, 1997

[51] Int. Cl.[6] .................................................... B62D 43/10
[52] U.S. Cl. .............................................................. 296/37.3
[58] Field of Search ............................................. 296/37.3

[56] References Cited

U.S. PATENT DOCUMENTS 5,061,002  10/1991  Saso ........................................ 296/37.3
5,669,534   9/1997  Edgerley ................................. 296/37.3

Primary Examiner—Gary C. Hoge
Attorney, Agent, or Firm—James R. Yee

[57] ABSTRACT

A reinforced cover for a vehicle spare tire storage system. A cover for vehicle spare tire storage system is reinforced through a reinforcing structure including a plurality of radial reinforcing members. The members are formed from a blow molded dual layer cover by pressing together the two layers at certain points to form a series of "tack-offs" or cleats which in turn create channels. A peripheral flange extends perpendicular to the cover around the perimeter of the cover for engagement with the floor of the vehicle. In the preferred embodiment, the reinforcing structure further includes a plurality of arcuate reinforcing members.

13 Claims, 3 Drawing Sheets

VEHICLE SPARE TIRE STORAGE SYSTEM HAVING A REINFORCED COVER

BACKGROUND OF THE INVENTION

1. Technical Field The present invention generally relates to a storage system for a vehicle spare tire. More particularly, the present invention relates to a reinforced cover for a storage system for a spare tire of a vehicle having a rearwardly located storage area, the storage system including a storage tub located below the floor of the vehicle and a reinforced cover therefore.

2. Discussion

Automotive vehicles, such as minivans, vans, station wagons, sport utilities and the like are often purchased for their carrying capacity. These types of vehicles typically include a rear storage area accessible via a lift gate or tail gate. Because such vehicles are not provided with a trunk, packaging issues frequently arise concerning storage of the spare tire. Frequently, the spare tire is mounted in an upright position within the rearward storage area and adjacent one of the vehicle side walls. However, this type of storage significantly impacts the carrying capacity of the vehicle and reduces visibility.

It is also known to mount the spare tire to the underside of the vehicle body. Here, access to the spare tire is difficult. In other arrangements, the spare tire is mounted to the lift gate or on a swing gate positioned adjacent the lift gate. Such arrangements are disadvantageous in that additional weight is carried by the lift gate or the swing gate must be moved out of the way before access to the lift gate may be obtained.

It is also known to store the spare tire within a storage compartment or tub provided below the vehicle's floor. A cover is typically provided for concealing the tub. While the tub does not impede upon the carrying capacity of the rearward storage area and access to the spare tire is relatively easy, the amount of weight which may be positioned directly above the tub is limited due to the load carrying capacity of conventional covers. As a result, larger adults and cargo of significant weight cannot be placed above the tub.

SUMMARY OF THE INVENTION

Accordingly, it is a principal objective of the present invention to provide a storage system for a vehicle spare tire which does not limit the weight or size of the cargo carried within a rear storage area of a mini-van, van, sport utility vehicle, station wagon, or the like. It is another objective of the present invention to provide a storage system for a vehicle spare tire which does not impede access to a rear storage area of the vehicle through a liftgate. It is a more particular object of the present invention to provide a storage system for a vehicle spare tire which includes a weight bearing cover.

In one form, the present invention provides a cover for a spare tire storage system including a tub located beneath a floor of a vehicle. The cover includes a dual layer main body portion with radial reinforcing portions. In one form the reinforcing portions consist of radial "tack-offs" or cleats formed in a blow-molded body.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
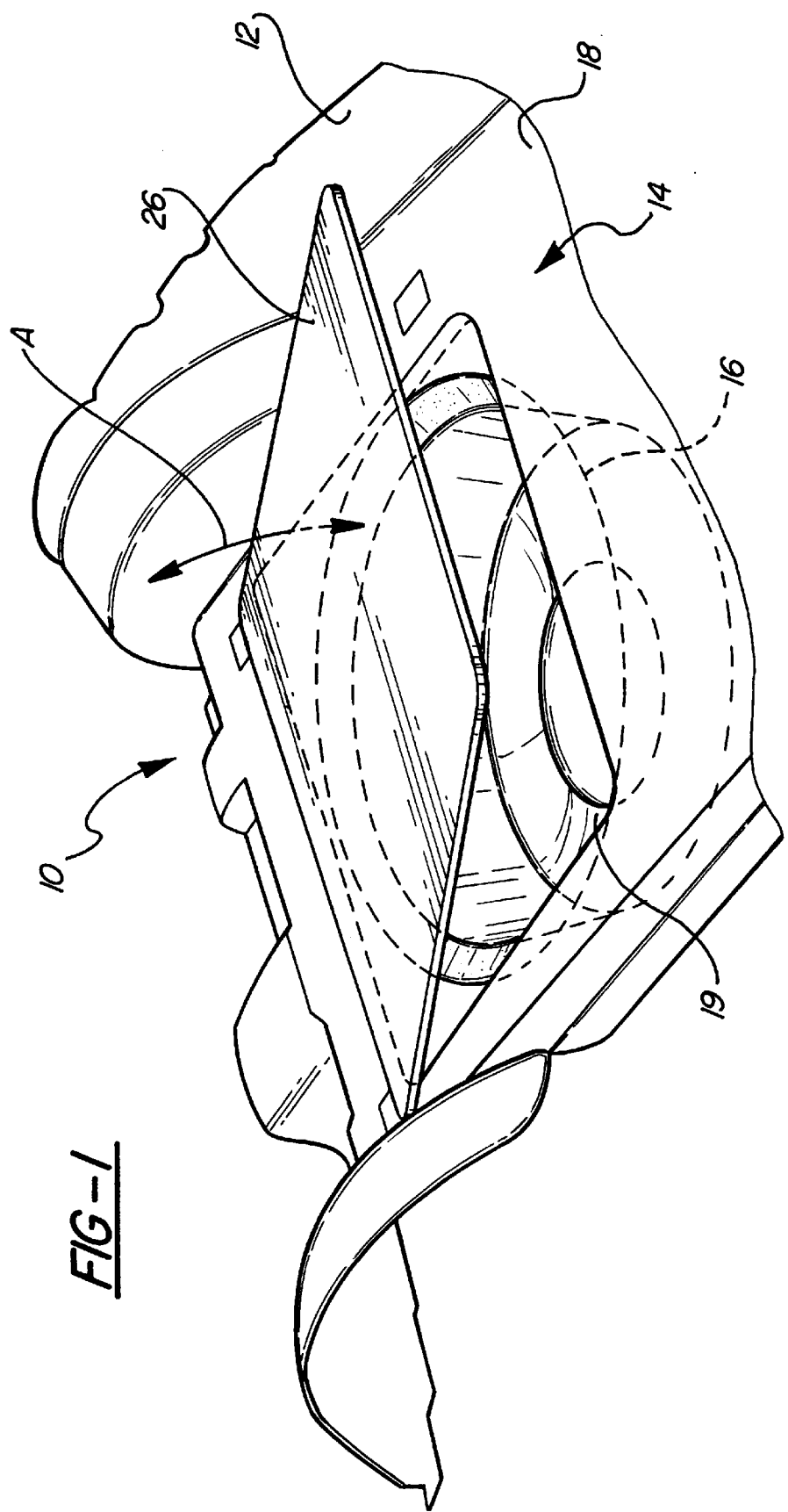
FIG. 1 is a fragmentary environmental view illustrating a portion of a motor vehicle incorporating the storage system for a spare tire constructed in accordance with the teachings of a preferred embodiment of the present invention.

Turning first to the fragmentary view of FIG. 1, a spare tire storage system 10 for a motor vehicle 12 is illustrated. The spare tire storage system 10 is shown operatively installed within a rear storage area 14 of the vehicle 12. The exemplary vehicle partially shown in FIG. 1 is a minivan, sport utility vehicle, or the like. However, it will be understood that the teachings of the present invention are more widely applicable to various other vehicles.

The spare tire storage system 10 of the present invention is shown to include a tub 16 located below the floor 18 of the vehicle 12. The tub 16 defines a storage area 20 for storing a spare tire 22. The spare tire 22 illustrated is a full-size spare, but alternatively a reduced-size spare may be stored. The spare tire 22 is secured within the storage area 20 by a conventional clamping mechanism 24. The spare tire storage system 10 is further shown to include a cover 26 for selectively providing access to the storage area 20. Much of the focus of the present invention relates to the cover 26.

Figure 2:
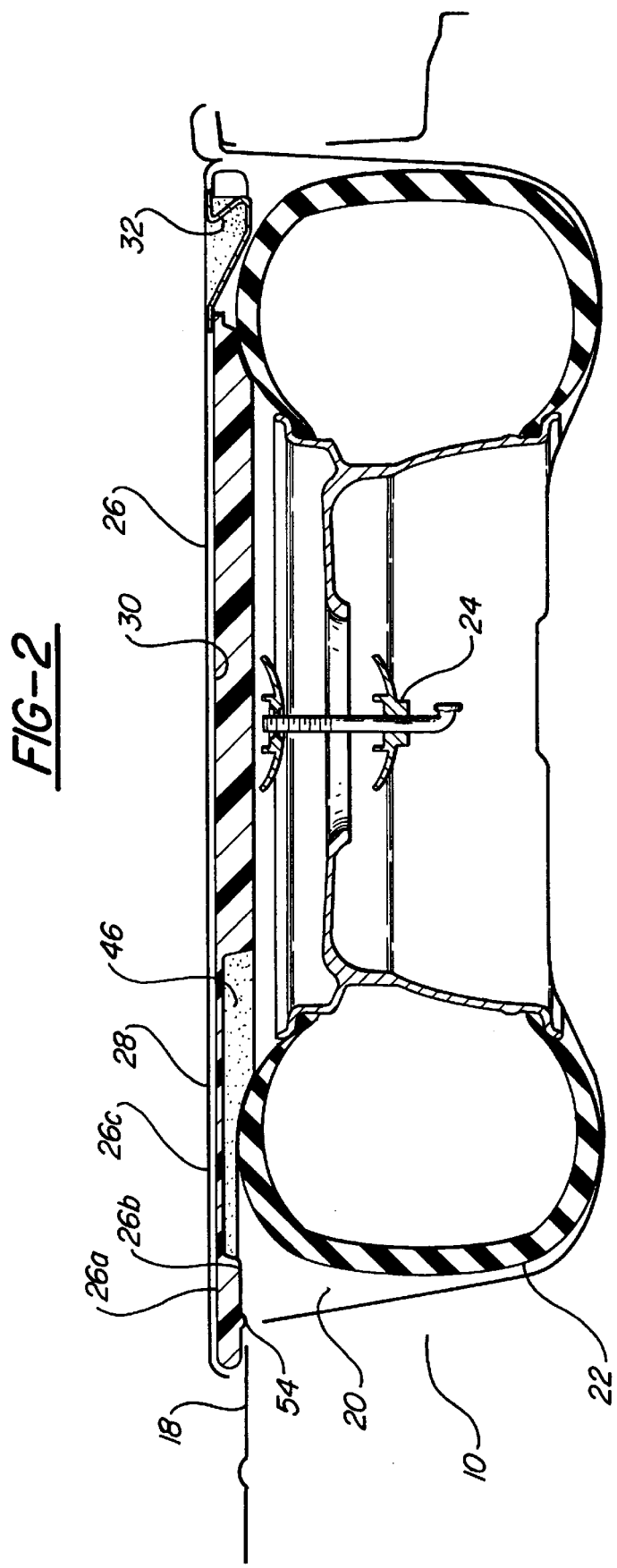
FIG. 2 is a cross-sectional view taken along the fore/aft center line of the vehicle of FIG. 1.
Figure 3:
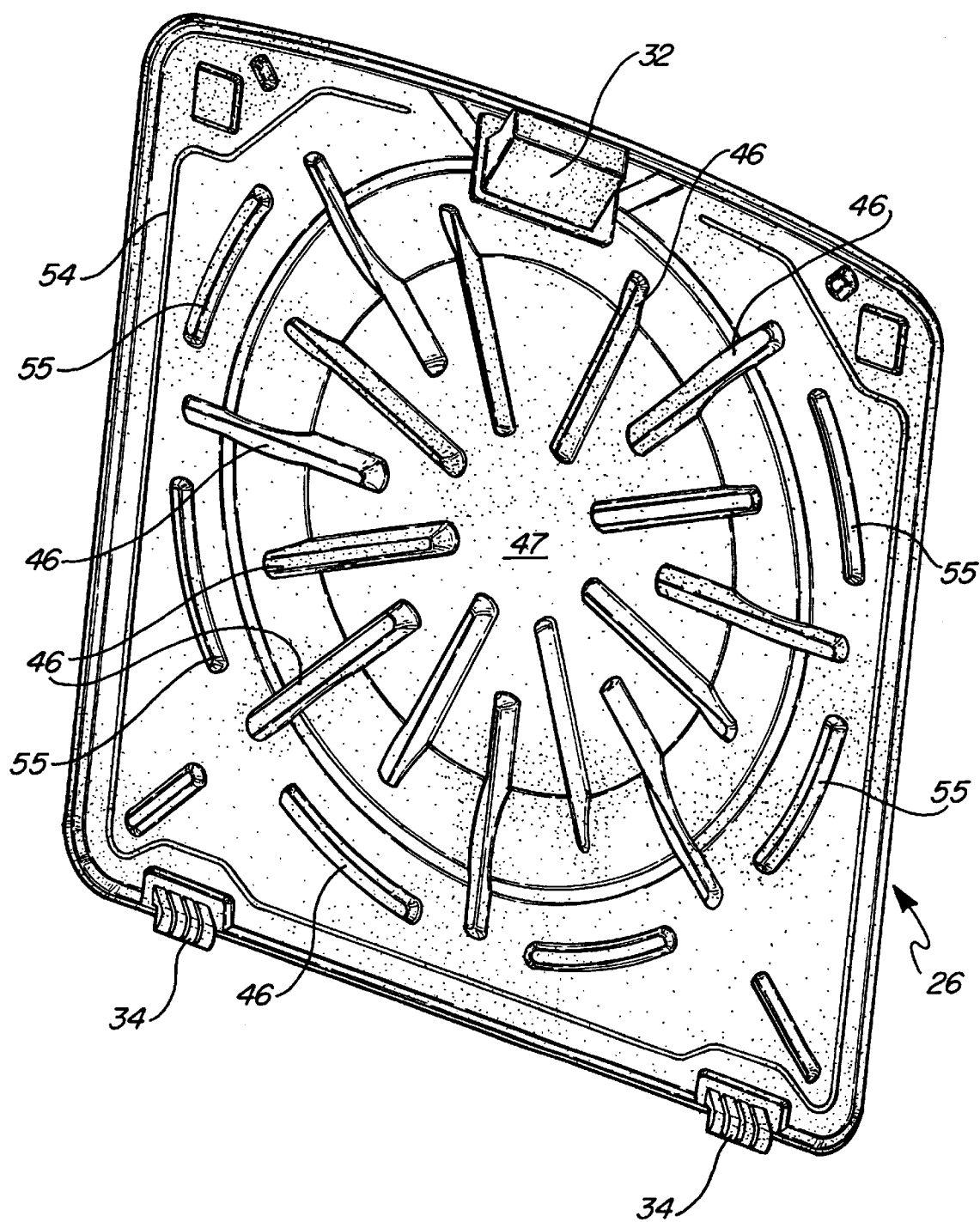
FIG. 3 is a bottom perspective view of the cover of FIGS. 1 and 2.

With continued reference to FIG. 1 and additional reference to FIGS. 2 and 3, the cover 26 will now be further described. In general, the cover 26 includes an upper side 28 which may be carpeted and a lower or underside 30. The cover 26 is also shown to generally include a handle 32 and a pair of pivot tabs 34. The pivot tabs 34 are adapted to engage recesses (not specifically shown) carried by the vehicle to facilitate pivotal movement of the cover from a closed position (as shown in FIG. 2) and open position (partially shown in FIG. 1). The direction of movement is indicated by arrow A. The pivot tabs 34 also permit quick and easy withdrawal of the cover 26 from the vehicle 12.

As specifically shown in FIGS. 2 and 3, the cover 26 preferably is a dual layer (26a and 26b) blow molded member, manufactured preferably from a blow-moldable material, and more preferably from 30% glass-filled polypropylene, and covered by carpet layer 26c. Any suitable material may be used to construct the dual layer cover, for example, two stampings of steel may be joined at their edges.

Cover 26 includes a plurality of reinforcing members 46 (a representative number of which are labeled) that rigidify the cover allowing loads to be placed thereupon with or without the spare tire 22 within the storage cavity 20. Members 46 extend in a radial direction from the center of cover 26, and in the preferred embodiment shown are formed by forming "tack-offs" or cleats during the blow-molding process. These are formed by pressing layers 26a and 26b together at certain locations (between the resulting members) to form a single layer (tack-off) in those locations. The resulting reinforcing members appear as closed, generally rectangular radial channels in the cover, between successive tack-offs and impart the desired stiffness. A plurality of arcuate reinforcing structures 55 are formed in a similar fashion and add further stiffness. Manufacturing in this manner, that is, blow molding a two layer structure and forming reinforcing structures at certain locations by forming a single layer, results in savings in both cost and weight.

The reinforcing structure is shown further to include a peripheral support flange 54 disposed adjacent the perimeter of cover 26 and corresponding in shape to opening 19, extending perpendicular therefrom. The support flange 54 cooperates with the floor 18 of the vehicle 12 to support cover 25 and hold it in place.

While the above description constitutes the preferred embodiment of the invention, it will be appreciated that the invention is susceptible to modification, variation, and change without departing from the proper scope or fair meaning of the accompanying claims.

We claim:

1. A cover for a spare tire storage system including a tub located beneath a floor of a vehicle, the cover comprising:

a main body portion including a plurality of radial reinforcing structure, said reinforcing structures comprise channels formed by tack-offs.

2. The cover for a spare tire storage system of claim 1 wherein said cover further comprises two layers.

3. The cover for a spare tire storage system of claim 2 wherein said cover is blow molded.

4. The cover for a spare tire storage system of claim 2 wherein said cover comprises 30% glass filled polypropylene.

5. The cover for a spare tire storage system of claim 2 further comprising a plurality of arcuate reinforcing members.

6. A spare tire storage system for a motor vehicle including a rearward storage area and a floor, the spare tire storage system comprising:

a tub located below the floor of the vehicle, said tub including a storage area and an opening thereto; and a cover for selectively closing said opening to said storage area;

said cover comprising a plurality of radial reinforcing structures and a plurality of arcuate reinforcing members.

7. The spare tire storage system of claim 6, wherein said cover comprises two layers.

8. The spare tire storage system of claim 6, wherein said reinforcing structures comprise channels formed by tack-offs.

9. The spare tire storage system of claim 6 wherein said cover is blow molded.

10. The spare tire storage system of claim 6 wherein said cover comprises 30% glass filled polypropylene.

11. In a spare tire storage system for a motor vehicle including a storage tub located below a floor of the motor vehicle and a dual layer blow molded cover for selectively closing the storage tub, the improvement comprising a reinforcement structure for the cover, the reinforcement structure comprising a plurality of laterally extending reinforcing members, wherein said reinforcing members are formed by pressing together certain portions of said two layers.

12. In the spare tire storage system of claim 11, wherein the reinforcement structure further comprises a plurality of arcuate reinforcing members.

13. In the spare tire storage system of claim 12, wherein said arcuate members are formed by pressing together selected portions of said two layers.

* * * * *